(12) United States Patent
Koehler

(10) Patent No.: US 6,426,815 B1
(45) Date of Patent: Jul. 30, 2002

(54) WDM RING TRANSMISSION SYSTEM HAVING TWO HUBS

(75) Inventor: Steffen Koehler, Annapolis, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/152,741

(22) Filed: Jun. 19, 1998

(51) Int. Cl.$^7$ ................................................ H04B 10/20
(52) U.S. Cl. ...................... 359/119; 359/127; 359/128; 359/130
(58) Field of Search ................... 359/119, 127, 359/128, 130

(56) References Cited

U.S. PATENT DOCUMENTS

| | | | | |
|---|---|---|---|---|
| 5,278,824 A | * | 1/1994 | Kremer | 370/15 |
| 5,333,130 A | * | 7/1994 | Weissmann et al. | 370/16 |
| 5,548,431 A | * | 8/1996 | Shin et al. | 359/119 |
| 5,576,875 A | * | 11/1996 | Chawki et al. | 359/125 |
| 5,717,795 A | * | 2/1998 | Sharma et al. | 385/24 |
| 5,745,269 A | * | 4/1998 | Chawki et al. | 359/119 |
| 5,764,821 A | * | 6/1998 | Glance | 385/14 |
| 5,854,698 A | * | 12/1998 | Eskildsen et al. | 359/119 |
| 5,920,412 A | * | 7/1999 | Chang | 359/128 |
| 5,923,449 A | * | 7/1999 | Doerr et al. | 359/125 |
| 6,002,503 A | * | 12/1999 | Mizrahi | 359/124 |
| 6,025,941 A | * | 2/2000 | Srivastava et al. | 359/119 |
| 6,034,798 A | * | 3/2000 | Oberg | 359/119 |
| 6,084,694 A | * | 7/2000 | Milton et al. | 359/124 |
| 6,108,311 A | * | 8/2000 | Ramaswami et al. | 370/258 |
| 6,130,764 A | * | 10/2000 | Taniguchi | 359/119 |
| 6,137,603 A | * | 10/2000 | Henmi | 359/110 |
| 6,243,179 B1 | * | 6/2001 | Thompson et al. | 359/130 |

FOREIGN PATENT DOCUMENTS

| | | |
|---|---|---|
| EP | 0677935 | 10/1995 |
| FR | 2756442 | 5/1998 |
| WO | 9804058 | 1/1998 |
| WO | 9825365 | 6/1998 |

OTHER PUBLICATIONS

Kremer, W., "Sonet Bidirectional Line–Switched Rings", Proceedings of the National Communication Forum, vol. 45, (1991).

* cited by examiner

*Primary Examiner*—Leslie Pascal
*Assistant Examiner*—Hanh Phan
(74) *Attorney, Agent, or Firm*—David L. Soltz

(57) ABSTRACT

A WDM ring transmission system is provided having two hubs. Identical groups of optical signals for transmission along the ring are input to both hubs, but one of the hubs includes optical switches for selectively passing one of the groups of optical signals to the WDM ring. Accordingly, if a fault occurs in one of the network-hub connections or one of the hubs becomes defective, the switches couple optical signals from the operational hub to the WDM ring. In addition, optical signals emitted by nodes coupled to the WDM ring are output from both hubs, thereby insuring that signals can be output from, and input to, the ring even if one of the hubs fails.

19 Claims, 8 Drawing Sheets

WDM RING TRANSMISSION SYSTEM HAVING TWO HUBS

The present invention is directed toward a wavelength division multiplexed (WDM) ring transmission system having two hubs for providing redundant connections to the WDM ring transmission system for improved protection.

BACKGROUND OF THE INVENTION

Wavelength division multiplexing (WDM) is being explored as an approach for economically increasing the capacity of existing fiber optic networks. WDM systems typically include a plurality of transmitters, each respectively transmitting optical signals on a designated wavelength or channel. As a result, fiber capacity can be increased by a multiple equal to the number of channels.

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring, each node providing a connection to an office building, for example. Each optical signal carried by the ring has a unique wavelength corresponding to a particular destination. Thus, for example, one node may add and drop optical signals having a wavelength of 1552.5 nm, while another node may add and drop optical signals at 1553.3 nm. An optical hub is often positioned at a single location along the ring, providing an interface between the WDM ring and an external network. The hub receives either optical or electrical signals from the (external) network which are destined for one of the nodes coupled to the WDM ring. The hub then emits an optical signal modulated in accordance with the signals received from the network at a wavelength associated with the recipient node. The modulated signal is next sensed at the destination node. This node, in turn, can emit optical signals at the associated wavelength, which are detected by the hub and converted to either optical or electrical signals to be transmitted to the external network.

If the connection between the network and the hub fails, or a fault occurs within the hub itself, the entire WDM ring and all the nodes connected thereto are isolated from the network. Accordingly, there is a need for a fault tolerant WDM ring transmission system which can maintain a reliable connection to an external network through a hub.

SUMMARY OF THE INVENTION

Consistent with the present invention, a WDM looped or ringed transmission system is provided including first and second optical hubs coupled along the ring. The first optical hub has first and second input ports, as well as first and second output ports. The first input port is configured to receive a first plurality of optical signals, each at a respective one of a first plurality of wavelengths, and the first output port is configured to output the first plurality of optical signals to a looped optical communication path. The second input port is configured to receive the first plurality of optical signals and a second plurality of optical signals, each at a respective one of a second plurality of wavelengths. In addition, the second output port of the first optical hub is configured to output the second plurality of optical signals.

The second optical hub comprises first and second input ports and first and second output ports. The first input port is configured to receive the second plurality of optical signals from the looped optical communication path, and the second input port is configured to receive the first plurality of optical signals. The first output port is configured to output the second plurality of optical signals, and the second output port is configured to output the first and second pluralities of optical signals to the second input port of the first optical hub.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

In accordance with the present invention, a WDM ring transmission system is provided having two hubs. Optical signals are paired and each signal within a given pair is supplied to a respective hub, but one of the hubs includes optical switches for choosing one optical signal within each pair for transmission to the nodes of the WDM ring. Accordingly, if a fault occurs in one of the network-hub connections or one of the hubs becomes defective, the switches couple optical signals from the operational hub to the WDM ring. In addition, optical signals emitted by nodes coupled to the WDM ring are output from both hubs, thereby insuring that signals can be output from the ring even if one of the hubs or one of the hub-network connections fails.

Figure 1:
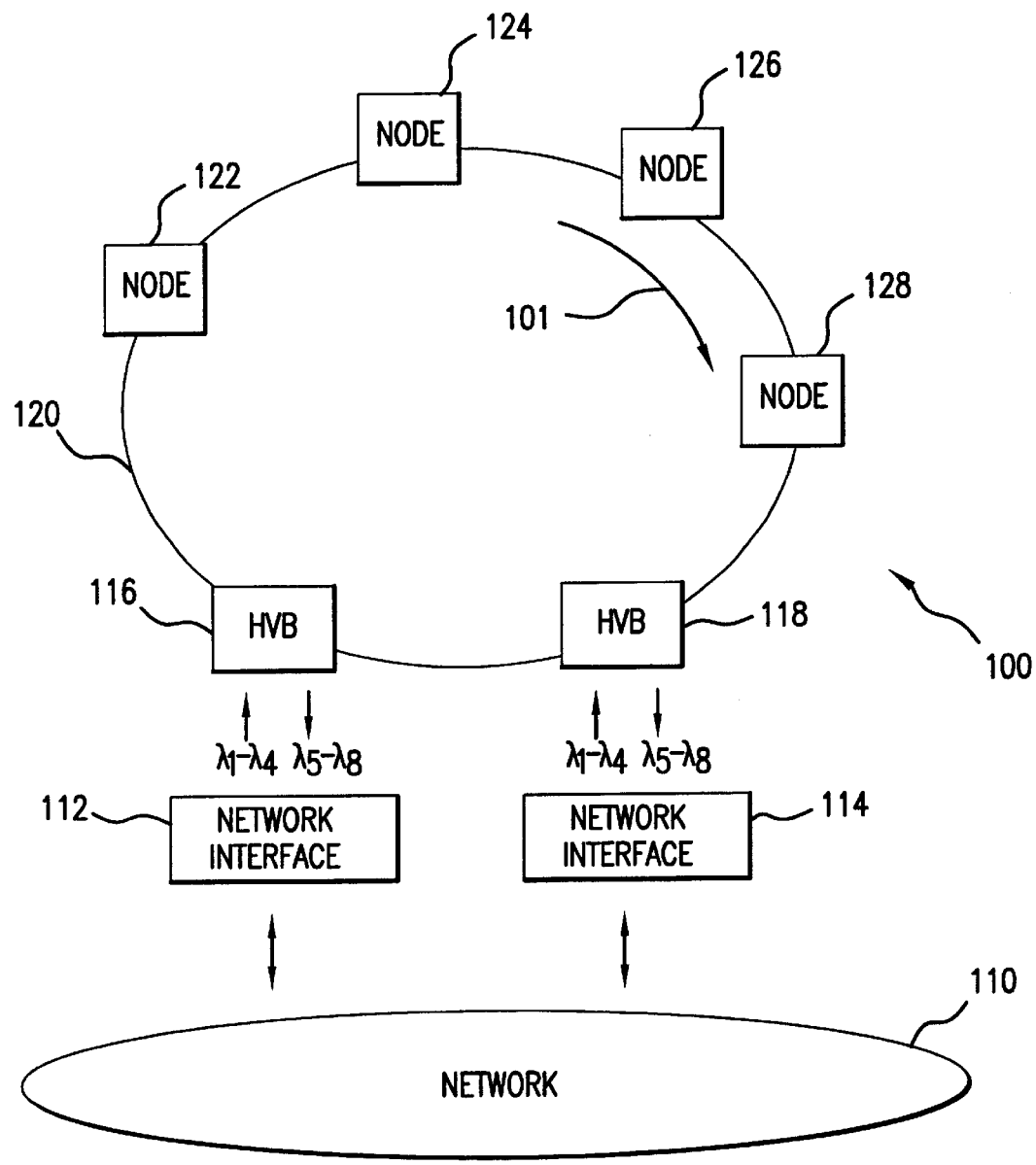
FIG. 1 illustrates a WDM ring transmission system in accordance with an embodiment of the present invention.

Turning to the drawings in which like reference characters indicate the same or similar elements in each of the several views, FIG. 1 illustrates a WDM ring or looped transmission system 100 in accordance with an embodiment of the present invention. Data from external network 110 is supplied to WDM ring transmission system 100 via connections such as network interface circuits 112 and 114. Optional network interface circuits 112 and 114 include optical transmitters (e.g., directly or externally modulated lasers and associated circuits) that emit optical signals at a respective one of wavelengths $\lambda_1$ to $\lambda_4$ to hubs 116 and 118. The optical signals input to hub 118 propagate, for example, in clockwise direction (in FIG. 1) to hub 116. Hub 116, in turn, selectively emits one or more of the $\lambda_1$ to $\lambda_4$ optical signals supplied from network interface circuit 112 or one or more of the $\lambda_1$ to $\lambda_4$ optical signals input from hub 118.

The $\lambda_1$ to $\lambda_4$ optical signals then propagate along looped optical communication path 120, e.g., a single optical fiber, to nodes 122, 124, 126 and 128, which respectively extract one of the optical signals at a respective one of wavelengths $\lambda_1$ to $\lambda_4$. Each of nodes 122, 124, 126 and 128 further emit optical signals at a respective one of wavelengths $\lambda_5$ to $\lambda_8$ carrying data for transmission to network 110. The $\lambda_5$ to $\lambda_8$ optical signals propagate in a clockwise direction shown in FIG. 1 to hubs 116 and 118. The $\lambda_5$ to $\lambda_8$ optical signals are next passively split in node 118, and then demultiplexed in node 116. Accordingly, the $\lambda_5$ to $\lambda_8$ optical signals are output from both hubs to respective network interface circuits 112 and 114. The network interface circuits may further include photodetectors and associated electrical and/or optical components for supplying electrical and/or optical signals to network 110 corresponding to the optical signals emitted by nodes 122, 124, 126 and 128.

Figure 2:
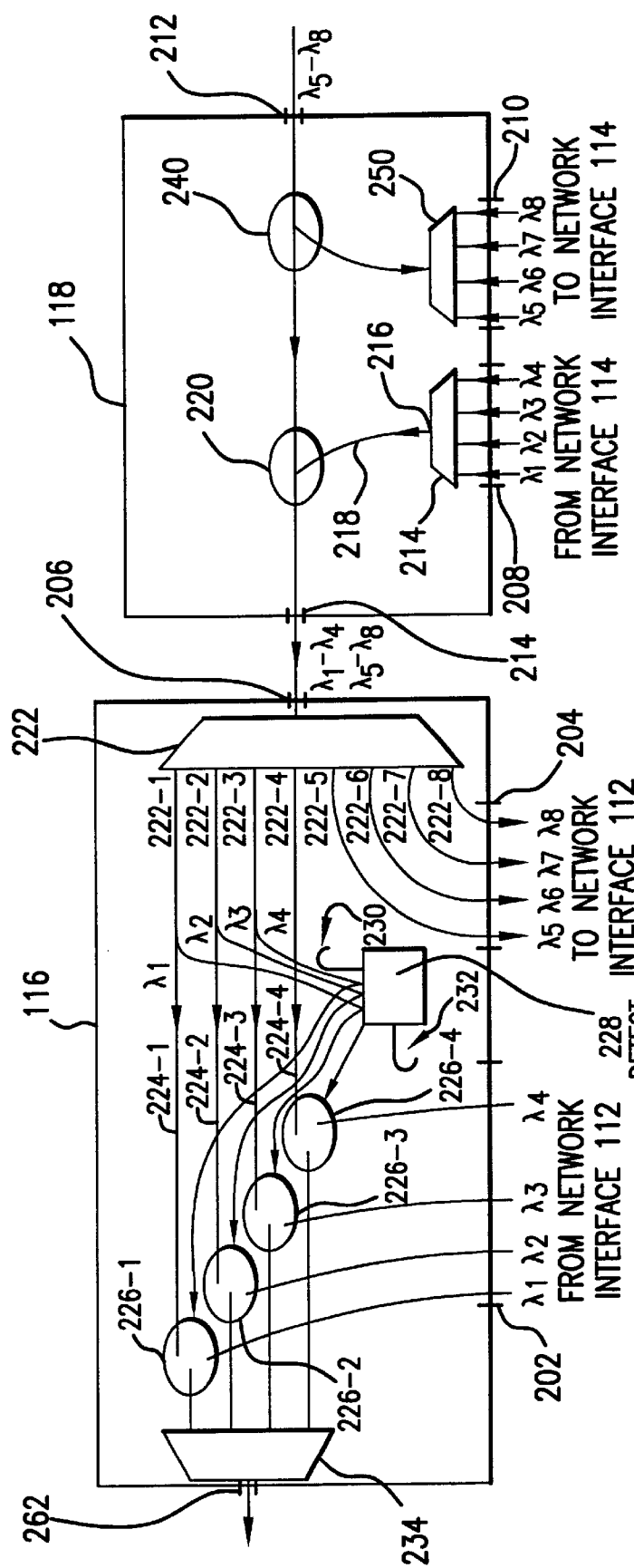
FIG. 2 illustrates a detailed schematic of first and second optical hubs in accordance with a first embodiment of the present invention.

FIG. 2 illustrates hubs 116 and 118 associated with optical communication path 120 in greater detail. Optical signals at wavelengths $\lambda_1$ to $\lambda_4$ are supplied to both hubs 116 and 118 through inputs 202-1 to 202-4 and 208-1 to 208-4 of ports 202 and 208, respectively. The optical signals input through port 208 are typically supplied to optical multiplexer 234 having a plurality of inputs, each of which receiving a respective one of optical signals at wavelengths $\lambda_1$ to $\lambda_4$. These optical signals are combined and passed through output 216 onto a single fiber 218. Optical combiner 220, coupled to fiber 218, combines the optical signals at wavelengths $\lambda_1$ to $\lambda_4$ with optical signals at wavelengths $\lambda_5$ to $\lambda_8$ received through port 212 of hub 118 for output through port 214.

The combined optical signals at wavelengths $\lambda_1$ to $\lambda_8$ are next fed to optical demultiplexer 222 through port 206. Optical demultiplexer 222, including, for example, an arrayed waveguide router, separates according to wavelength and supplies each optical signal at a respective output. As further shown in FIG. 2, optical signals at wavelengths $\lambda_5$ to $\lambda_8$ are directed to network interface circuit 112 via port outputs 222-5 to 222-8 and through corresponding sub-port outputs 204-1 to 204-4 of port 204. Optical signals at wavelengths $\lambda_1$ to $\lambda_4$, however, are supplied via sub-port outputs 222-1 to 222-4 and fibers 224-1 to 224-4 to respective optical switches 226-1 to 226-4. Optical switches 226-1 to 226-4 are also configured to receive optical signals at wavelengths $\lambda_1$ to $\lambda_4$ from network interface 112 via port 202.

Switches 226-1 to 226-4 selectively couple one of outputs 222-1 to 222-4 or sub-port inputs 202-1 to 202-4 to output port 262, via multiplexer 234, in response to control signals generated by detect and compare circuit 228. The control signals are generated in response to light sampled at each of the optical signal wavelengths $\lambda_1$ to $\lambda_4$. For example, optical couplers 230 and 232 supply sampled light at a particular wavelength, e.g., $\lambda_4$ to detect and compare circuit 228, which, in turn, compares these signals and adjusts switch 226-4 so that the best 4 optical signal is output through port 262. Additional couplers (not shown) sample light at the remaining wavelengths $\lambda_1$ to $\lambda_3$ so that detect and compare circuit 228 can compare optical signals output from ports 222-1 to 222-4 with optical signals from sub-ports 202-1 to 202-4. The comparison criteria used by circuit 228 may be as simple as the presence or absence of light, or may be as complex as examining diagnostic overhead bits in data traffic. If the light supplied from output 222-4 of demultiplexer 222, for example, fails, a control signal is output from detect and compare circuit 228 such that switch 226-4 directs the optical signal at wavelength $\lambda_4$ from network interface 112 for output through port 262. On the other hand, loss of signal detection of the $\lambda_4$ optical signal input through sub-port input 202-4 would cause optical switch 226-4 to output the optical signal at wavelength $\lambda_4$ received through port 206 to port 262. In a similar fashion, detect and compare circuit 228 compares the sensed light from ports 222-1 to 222-3 with light from port inputs 202-1 to 202-3, and generates control signals to individually adjust switches 226-1 to 226-4 so that the best signal at each wavelength is output through port 262.

Figure 3:
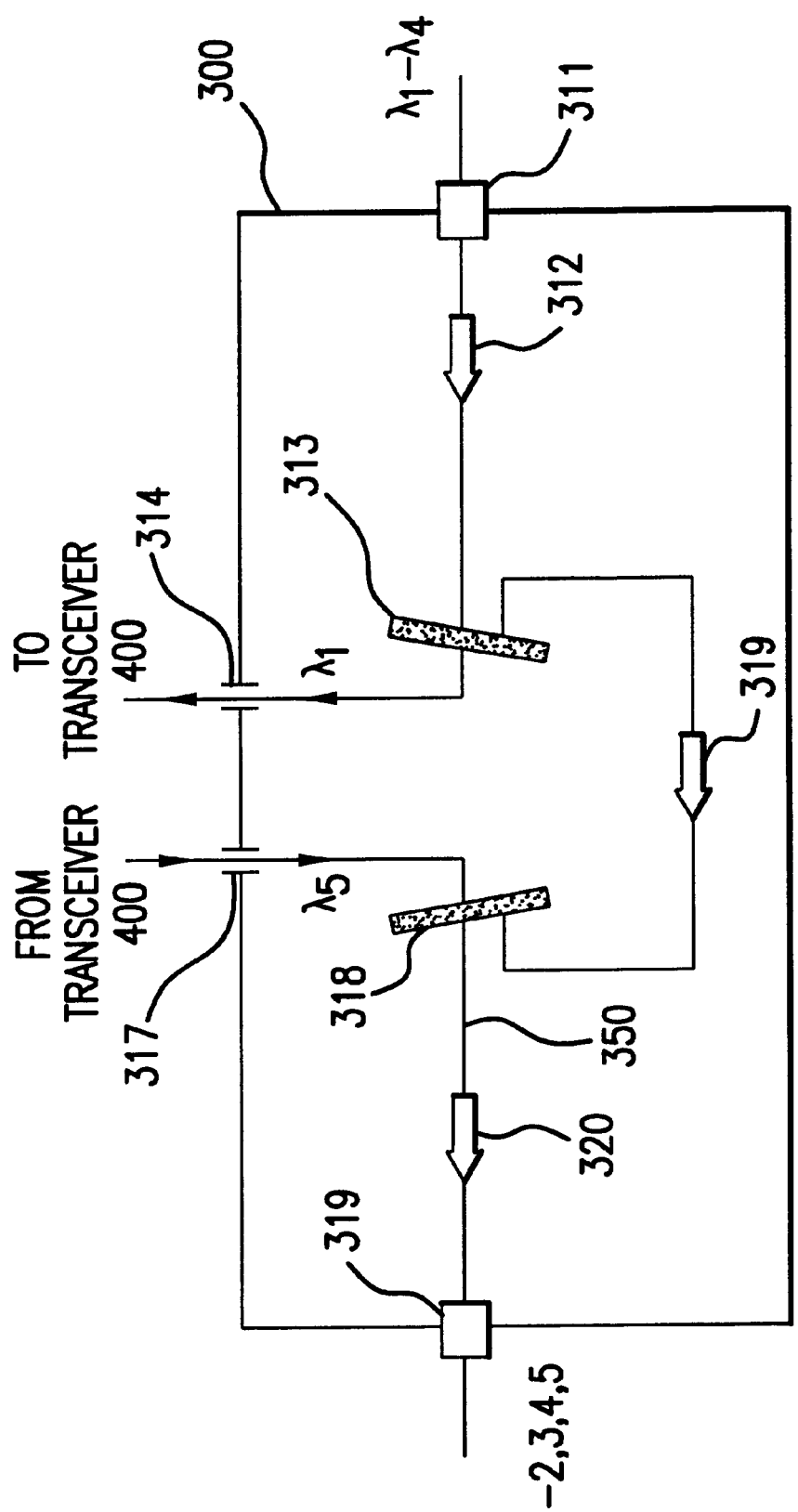
FIG. 3 illustrates an optical add/drop multiplexer.

Typically, nodes 122, 124, 126 and 128 have a similar construction and comprise an optical add/drop multiplexer and transceiver, which will now be described with reference to FIGS. 3 and 4, respectively. FIG. 3 illustrates optical add/drop multiplexer 300 provided in node 122, for example. This add/drop multiplexer is also described, for example, in U.S. patent application Ser. No. 08/956,807, filed Oct. 23, 1997 incorporated by reference herein. Optical signals at wavelengths $\lambda_{1\text{-}4}$ are fed via optional connector 311 to dielectric filter 313 in a direction indicated by arrow 312. Typically, dielectric filter 313 is configured to drop or select one of wavelengths $\lambda_{1\text{-}4}$, for example $\lambda_1$, while reflecting the remaining wavelengths, $\lambda_{2\text{-}4}$.

After passing through filter 313, the optical signal at wavelength $\lambda_1$ is input to transceiver 400, to be discussed in greater detail below, through port 314. Optical signals emitted by transceiver 400 at wavelength $\lambda_5$ are passed through port 317 to an additional dielectric filter 318. Remaining optical signals at wavelengths $\lambda_{2\text{-}4}$, reflected from filter 313, propagate along optical line 330 in a direction indicated by arrow 319 to filter 318. Filter 318 is configured to pass wavelength $\lambda_5$, for example, and reflect remaining wavelengths $\lambda_{2\text{-}4}$ to fiber 350. Accordingly, optical signals at wavelength $\lambda_5$ are combined with the remaining optical signals at wavelengths $\lambda_{2\text{-}4}$ on to fiber 350 such that these channels propagate in a common direction indicated by arrow 320 through optional connector 319. Connectors 311 and 319 are typically selected from the group of commercially available FC/PC, FC/APC, SC/PC, SC/APC, biconic, ST, and Diamond E2000 connectors. Alternatively, connectors 311 and 319 can be omitted and optical connections to the add/drop element can be made with fusion splices, for example.

Figure 4:
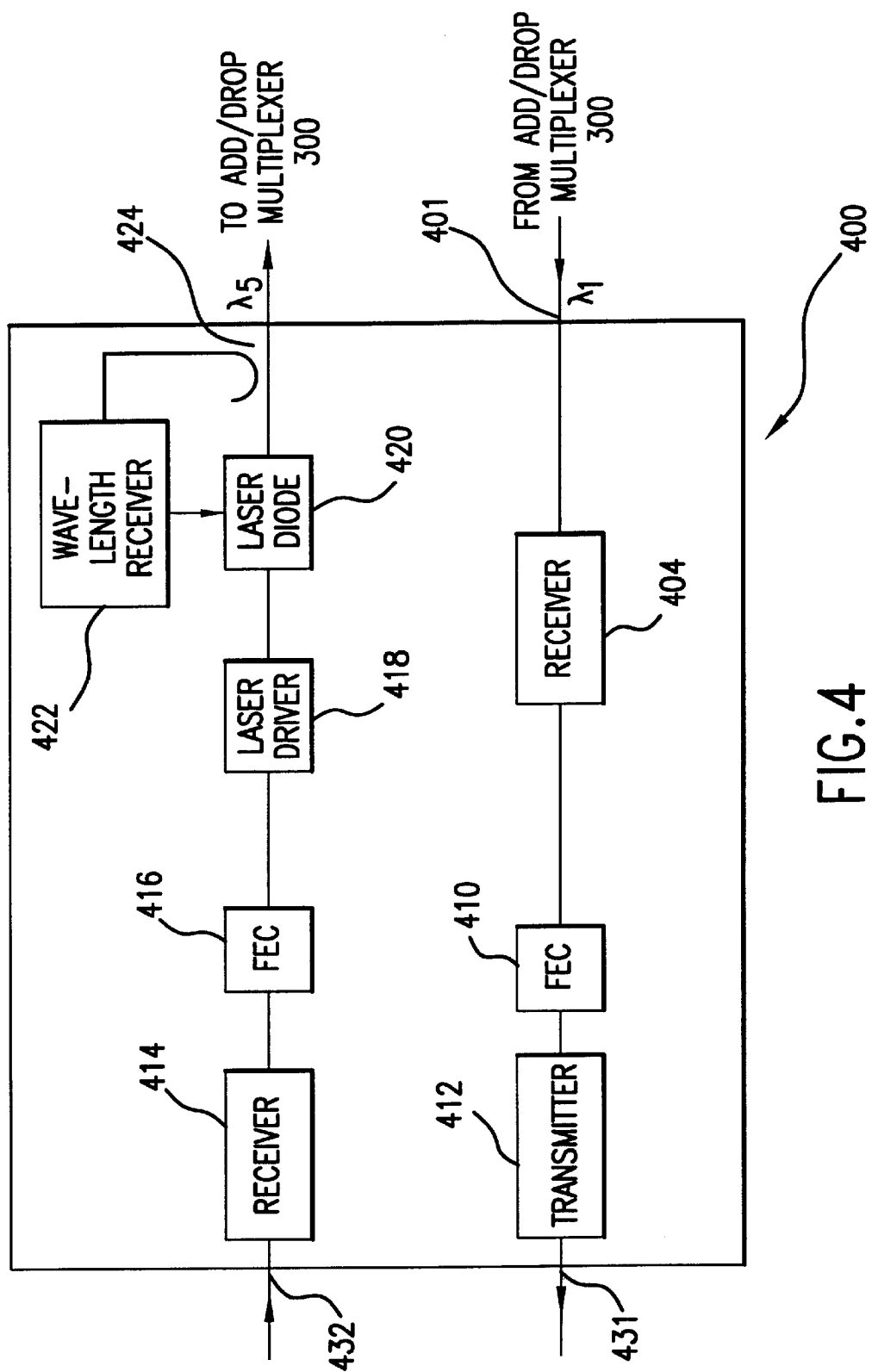
FIG. 4 illustrates a transceiver.

Transceiver 400 is shown in FIG. 4, and described in U.S. patent application Ser. No. 60/073,750, incorporated by reference herein. Transceiver 400 receives $\lambda_1$ optical signals output from add/drop multiplexer 300 via input port 401. Receiver 404 typically includes a photodetector for sensing these optical signals and outputs electrical signals in response thereto, and clock and data recovery circuitry. Optionally, the electrical signals output from receiver 414 are next decoded by FEC decoder circuit 410, as described, for example, in a U.S. patent application Ser. No. 08/955,058 entitled "Remodulating Channel Selectors For WDM Optical Communication Systems" by S. B. Alexander et al., filed Oct. 21, 1997 and incorporated by reference herein, which decodes and corrects errors present in the electrical signals output from receiver 404. The decoded electrical signals are next supplied to optical transmitter 412 which, in turn, outputs corresponding optical signals through port 431 to user equipment external to WDM ring transmission system 100.

As further shown in FIG. 4, transceiver 400 includes receiver 414, including a photodetector, for example, that receives optical signals through input port 432, and converts the received optical signals into electrical signals. Receiver 414 also includes circuitry that performs clock and data recovery from these electrical signals. The output of receiver 414 is optionally coupled to forward error correction (FEC)

encoder circuit 416 described, for example, in the patent application by S. B. Alexander et al. supra. The encoded output from FEC circuit 416 is coupled to laser driver 418, which supplies appropriate current to laser diode 420. Laser diode 420 is thus modulated by the output of laser driver 418 in accordance with the encoded electrical signals. Alternatively, laser diode 420 can be operated in a continuous wave (CW) mode and the output modulated with a Mach-Zehnder external modulator, as described, for example, in U.S. Pat. No. 5,504,609, incorporated herein by reference. Typically, a coupler 424 supplies a relatively small fraction of light output from the laser diode 420 to wavelength control circuit 422 for adjusting the temperature, and thus the wavelength of light output from laser diode 420 is tuned to be substantially equal to wavelength $\lambda_5$. The remaining light output from laser diode 420 is supplied to optical add/drop multiplexer 300. As a result, optical signals at wavelength $\lambda_5$ containing data associated with node 122 is supplied to WDM ring transmission system 100.

It should be noted that in the absence of FEC circuits 410 and 416 electrical signals generated by receivers 404 and 414 are typically supplied directly to transmitter 412 and laser driver circuit 418, respectively.

Nodes 124, 126 and 128 have a similar construction as node 122 described above. However, the add/drop multiplexers and transceivers cooperate to extract optical signals at wavelengths $\lambda_2$, $\lambda_3$, and $\lambda_4$, respectively, while adding optical signals at wavelengths $\lambda_6$ $\lambda_7$, and $\lambda_8$, respectively. Returning to FIG. 2, the $\lambda_6$ optical signals, as well as the optical signals at wavelength $\lambda_5$, are output from node 128 and fed through port 212 to splitter 240. The optical signals are then supplied to combiner 220, as discussed above, and to optical demultiplexer 250, which separates and outputs the optical signals at wavelengths $\lambda_5$ to $\lambda_8$ to network interface circuit 114 via corresponding outputs 210-1 to 210-4 of port 210. As further discussed above, the $\lambda_5$ to $\lambda_8$ optical signals are passed to hub 116 along with optical signals at wavelengths $\lambda_1$ to $\lambda_4$ input from network interface circuit 114. Typically, the wavelengths of the $\lambda_5$ to $\lambda_8$ optical signals are different than the $\lambda_1$ to $\lambda_4$ optical signals so that both groups of optical signals can propagate along the same fiber with little interference.

Thus, the optical signals at wavelengths $\lambda_5$ to $\lambda_8$ are output from WDM ring transmission system 100 at two locations, thereby improving reliability. Moreover, as discussed above, optical signals at wavelengths $\lambda_1$ to $\lambda_4$ are input at two locations, thereby insuring a continuous flow of data to and from WDM ring transmission system 100.

Figure 5:
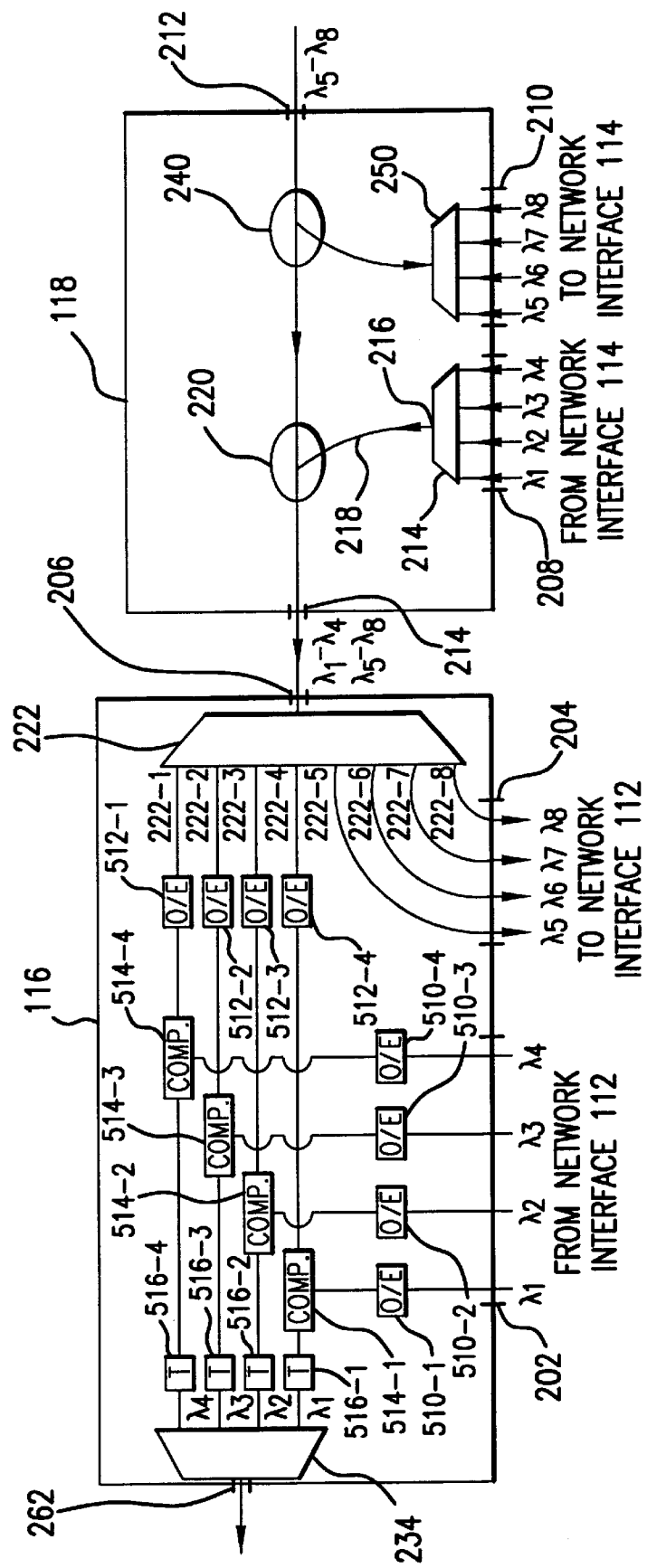
FIG. 5 illustrates a detailed schematic of the first and second hubs in accordance with a second embodiment of the present invention.

In accordance with an additional embodiment of the present invention, optical switches 226-1 to 226-4 are replaced by regenerative circuits comprising photodectors, comparator or comparison circuits, and laser transmitters. For example, as shown in FIG. 5, optical signals at wavelengths $\lambda_1$ to $\lambda_4$ input through port 202 are respectively supplied to photodetectors 510-1 to 510-4, which, in turn, supply corresponding electrical signals to comparator circuits 514-1 to 514-4, respectively. Optical signals output from demultiplexer 222 are also input to photodetectors 512-1 to 512-4, which output corresponding electrical signals to a respective one of comparator circuits 514-1 to 514-4. Comparator circuits 514-1 to 514-4 effectively pass electrical signals from either photodetectors 510-1 to 510-4 or 512-1 to 512-4 to optical transmitters 516-1 to 516-4, which supply appropriate optical signals at wavelengths $\lambda_1$ to $\lambda_4$ to multiplexer 234.

Comparator circuits 514-1 to 514-4 may simply sense the presence or absence of electrical signals generated by photodetectors 510-1 to 510-4 and 512-1 to 512-4, or may use diagnostic overhead bits in the data traffic as decision criteria. In any event, the comparator circuit passes electrical signals from the photodetector sensing the more healthy data stream. For example, if a portion of network interface circuit 112 supplying optical signals at wavelength $\lambda_2$ is disabled, photodetector 510-2 ceases to supply electrical signals to comparator circuit 514-2. Accordingly, comparator circuit 514-2 detects the absence of the output from photodetector 510-2, and passes electrical signals output from photodetector 512-3 to $\lambda_2$ transmitter 516-2. Thus, transmitter 516-2 retransmits the $\lambda_2$ optical signals in accordance with the electrical signals generated by photodetector 512-3.

In the embodiment shown in FIG. 5, photodetectors 510-1 to 510-4 can be located outside hub 116, for example in network interface circuit 112. In which case, electrical signals can be supplied directly from network interface circuit 112, for example.

In order to provide additional protection, a second WDM ring transmission system can be provided in conjunction with WDM ring transmission system 100. Such an additional WDM ring transmission system could maintain communication in the event of a fault, such as a break within WDM ring transmission system 100. The additional WDM ring transmission system, however, would carry optical signals propagating in a direction opposite the optical signals in WDM ring transmission 100.

Figure 6:
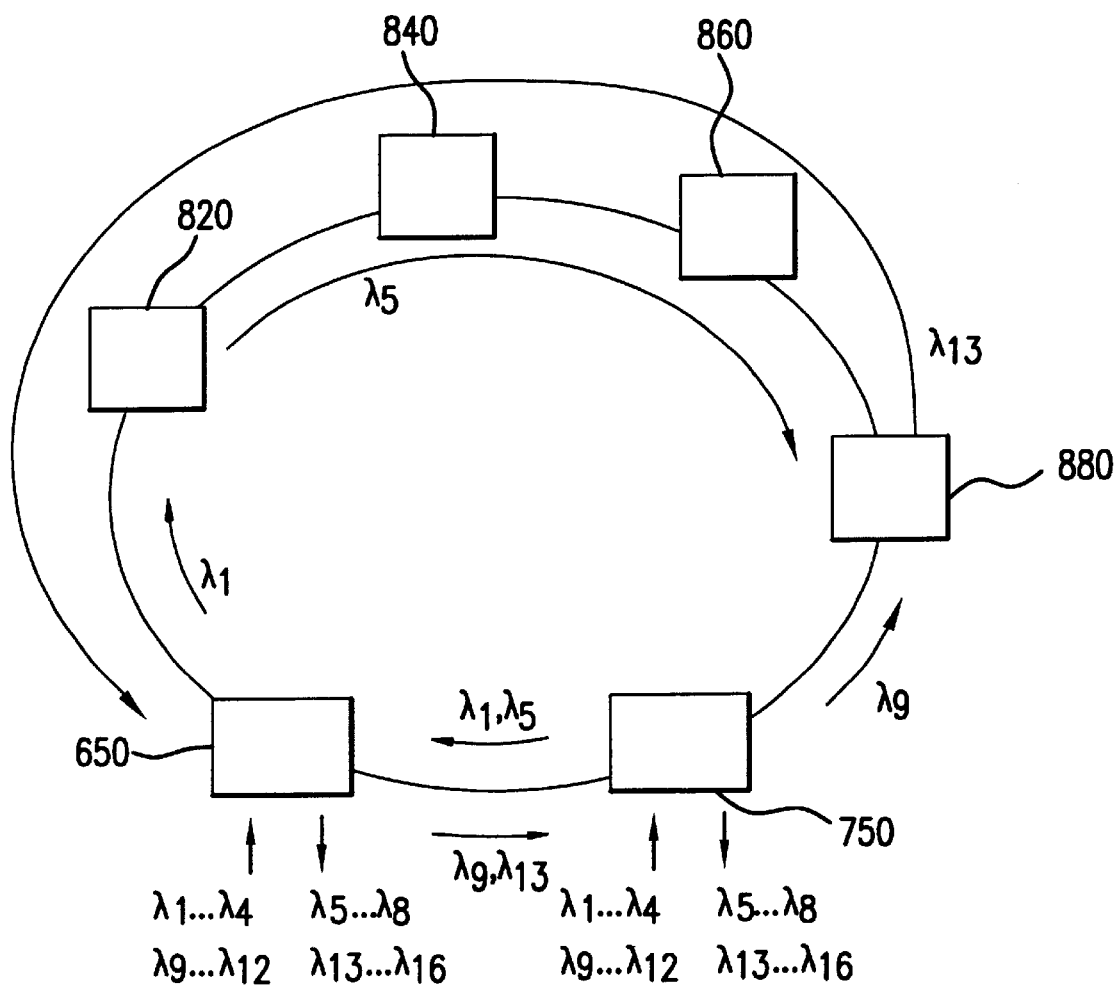
FIG. 6 illustrates a WDM ring transmission system in accordance with a further embodiment of the present invention.

An alternative to such a second counter-propagation WDM ring transmission system is to incorporate the above-described functionality of the second WDM ring on the same fiber. In which case, optical signals having respective first wavelengths propagate in one direction while other optical signals at respective second wavelengths propagate in a second direction along the same fiber. In accordance with a further embodiment of the present invention, two hubs provide protection in such a transmission system. In particular, as seen in FIG. 6, optical signals at wavelengths $\lambda_9$ to $\lambda_{12}$ are input at hubs 650 and 750 and propagate in a counter-clockwise direction in the figure. Optical signals at wavelengths $\lambda_1$ to $\lambda_4$ are also input at hubs 650 and 750, but propagate in a clockwise direction. Node 880, for example, drops optical signals at wavelength $\lambda_9$ and adds optical signals at wavelength $\lambda_{13}$, which continue propagating in the same direction as the $\lambda_9$ signals. In a similar fashion, optical signals at wavelength $\lambda_1$, propagating in the clockwise direction, are dropped at node 820, while optical signals at wavelength $\lambda_5$ are added at this node. Other nodes, e.g., nodes 840 and 860, similarly add and drop one or more selected pairs of wavelengths propogating in a common direction. For simplicity, only nodes 820 and 880 are illustrated adding and dropping wavlengths. It is understood, however, that other nodes can be provided to add and drop the remaining wavelengths shown in FIG. 6. Wavelengths $\lambda_5$ to $\lambda_8$ and $\lambda_{13}$ to $\lambda_{16}$ added by nodes coupled to optical communication path 120 are output at both hub 650 and hub 750.

Figure 7:
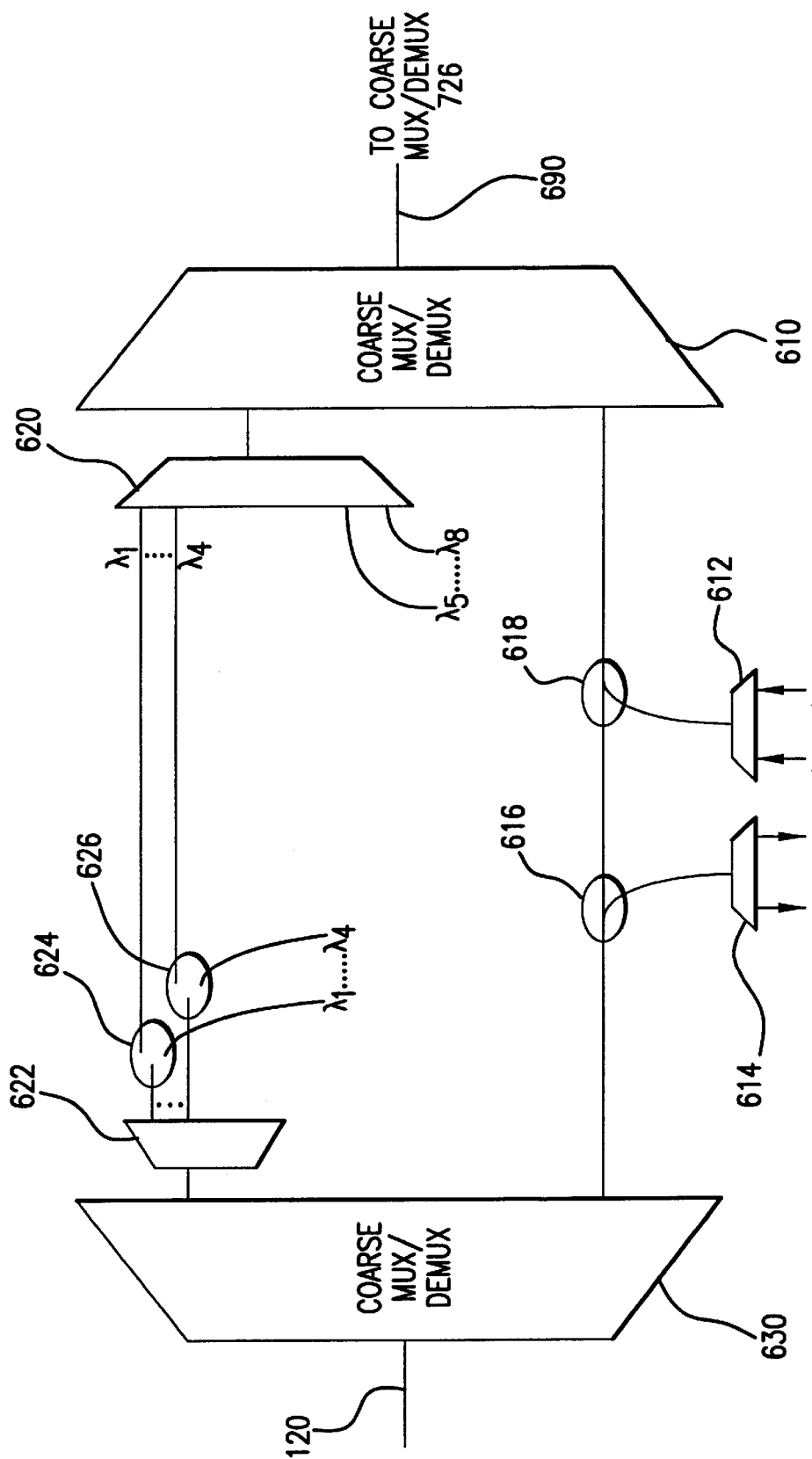
FIG. 7 illustrate a detailed schematic of a first hub shown in FIG. 6.
Figure 8:
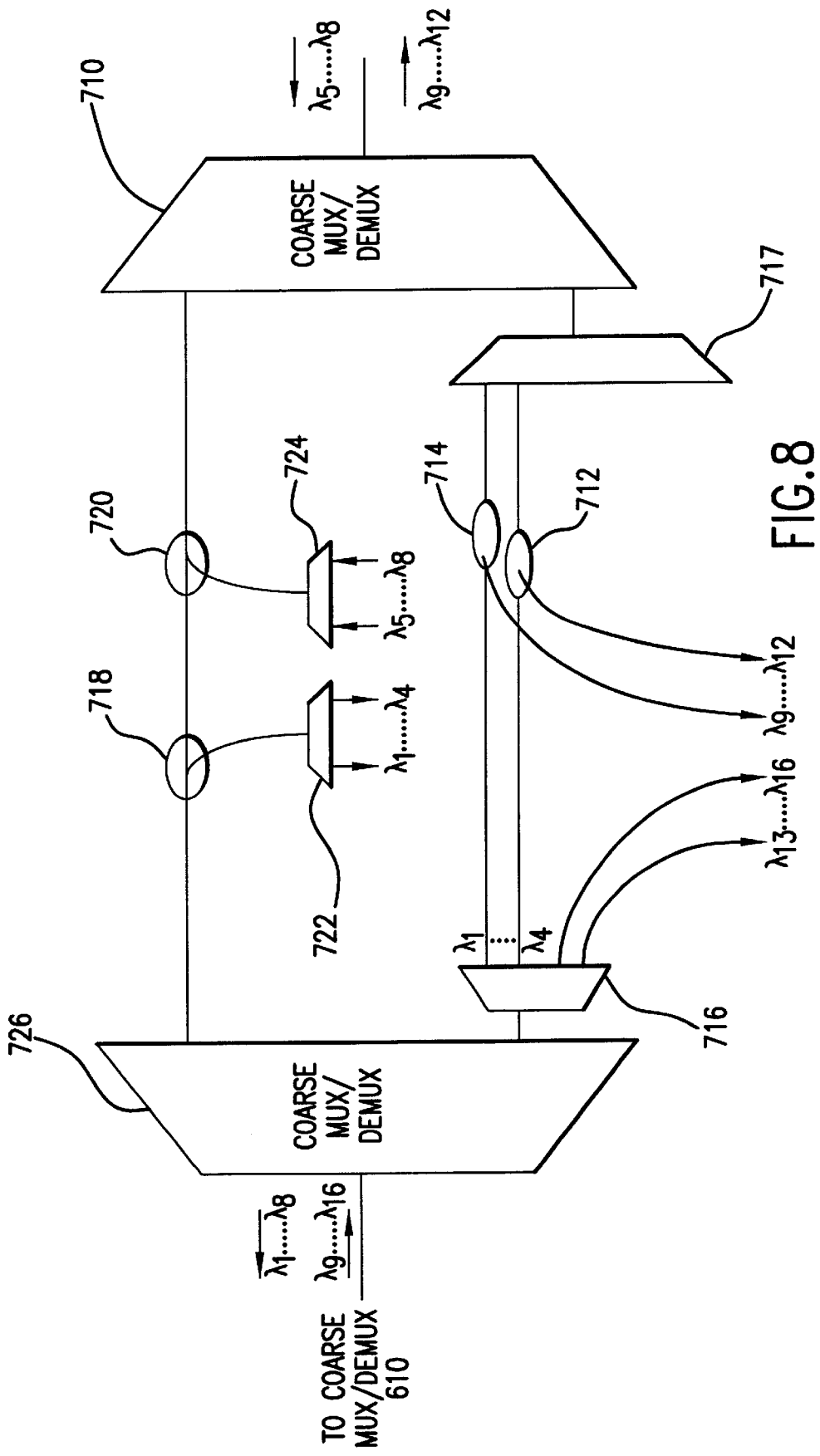
FIG. 8 illustrates a detailed schematic of a second hub shown in FIG. 6.

FIGS. 7 and 8 respectively illustrate hubs 650 and 750 in greater detail. Hubs 650 and 750 comprise input and output ports (not shown) as well as detect and compare circuits and associated couplers (not shown) similar to those described above with reference to FIG. 2. Moreover, hubs 650 and 750 also comprise switches 624, 626, 712 and 714; multiplexers 612, 622, 717 and 722; demultiplexers 614, 620, 716 and 724; optical combiners 618 and 718; optical splitters 616 and 720, which operate in a similar fashion as corresponding components described above with respect to hubs 116 and 118. Further discussion of the operation of these components shown in FIGS. 7 and 8 will thus be omitted. In addition, it is noted that the regenerative circuits discussed above with reference to FIG. 5 can replace the switches shown in FIGS. 7 and 8.

Unlike hubs 116 and 118, however, hubs 650 and 750 further typically comprise conventional coarse mux/demuxes having optical filters, for branching and combining groups of optical signals at particular wavelengths so that optical signals propagating in a specific direction are supplied to the appropriate combination of switches, multiplexers, demultiplexers, combiners and splitters. Thus, in FIG. 7 for example, coarse mux/demux 630 branches a group of optical signals at wavelengths $\lambda_{13}$ to $\lambda_{16}$ and supplies these signals to splitter 616. Coarse mux/demux 630 also directs or combines a group of optical signals at wavelengths $\lambda_1$ to $\lambda_4$ onto optical communication path 120. Coarse mux/demux 610, however, branches optical signals at wavlengths $\lambda_1$ to $\lambda_8$ and supplies these optical signals to demultiplexer 620, while outputting optical signals at wavelengths $\lambda_9$ to $\lambda_{16}$ to course mux/demux 726 via optical path portion 690.

In FIG. 8, filters 726 and 710 operate in a similar manner to appropriately branch and direct the optical signals at wavelengths $\lambda_1$ to $\lambda_{16}$. Accordingly, due to the presence of course mux/demxes 610, 630, 710 and 726, hubs 650 and 750 can effectively add and drop optical signals propagating in different directions.

While the foregoing invention has been described in terms of the embodiments discussed above, numerous variations are possible. Accordingly, modifications and changes such as those suggested above, but not limited thereto, are considered to be within the scope of the following claims. For example, the present invention is not limited to the number of wavelengths discussed above. Rather, the present invention encompasses any suitable number of wavelengths. Moreover, one or more additional nodes can be provided between hubs 116 and 118 shown in FIG. 1, as well as between hubs 650 and 750 in FIG. 6.

What is claimed is:

1. An optical communication apparatus, comprising:

a first optical hub having first and second input ports, and first and second output ports, said first input port configured to receive a first plurality of optical signals, each at a respective one of a first plurality of wavelengths, said first output port being configured to output said first plurality of optical signals to a looped optical communication path, said second input port being configured to receive a second plurality of optical signals each at a respective one of said first plurality of wavelengths, and a third plurality of optical signals, each at a respective one of a second plurality of wavelengths, and said second output port being configured to output said third plurality of optical signals away from said looped optical communication path; and a second optical hub having first and second input ports and first and second output ports, said first input port being configured to receive a fourth plurality of optical signals from said looped optical communication path, each of said fourth plurality of optical signals being at a respective one of said second plurality of wavelengths, said second input port being configured to receive said second plurality of optical signals, said first output port being configured to output said fourth plurality of optical signals away from said looped optical communication path, and said second output port being configured to output said second and third pluralities of optical signals to said second input port of said first optical hub.

2. An optical communication apparatus in accordance with claim 1, wherein said first optical hub comprises an optical switch, said switch being configured to selectively pass one of said first plurality of optical signals and said third plurality of optical signals to said first output port of said first optical hub.

3. An optical communication apparatus in accordance with claim 2, wherein said first optical hub further comprises:

a wavelength division demultiplexer having an input coupled to said second input port of said first optical hub and first and second outputs, said first output of said wavelength division demultiplexer being coupled to said second output port of said first optical hub, and said second output of said wavelength division demultiplexer being coupled to said optical switch.

4. An optical communication apparatus in accordance with claim 1, wherein said second optical hub further comprises:

an optical splitter having an input and first and second outputs, said input being coupled to said first input of said second optical hub, said first output being coupled to said first output port of said second optical hub, and said second output being coupled to said second output port of said second optical hub.

5. An optical communication apparatus in accordance with claim 4, wherein said second optical hub further comprises an optical combiner, having first and second inputs and an output, said first input being coupled to said first input port of said second optical hub, said second input being coupled to said second input port of said second optical hub, and said output being coupled to said second output port of said second optical hub.

6. An optical communication apparatus in accordance with claim 5, wherein said second optical hub further comprises:

an optical demultiplexer having an input and a plurality of outputs, said input being coupled to said first output of said optical splitter and said plurality of outputs being coupled to said first output port of said second optical hub; and an optical multiplexer having a plurality of inputs coupled to said second input port of said second optical hub and an output coupled to said second input of said optical combiner.

7. An optical communication apparatus in accordance with claim 1, wherein said first optical hub comprises:

an optical demultiplexer having an input coupled to said second input port of said first optical hub, and at least first and second outputs, said optical demultiplexer receiving said second and third pluralities of optical signals at said input and supplying said second optical signals at said first outputs and said third optical signals at said second outputs, said second outputs being coupled to said second output port of said first optical hub; and a plurality of optical switches, each of which being coupled to a respective one of said first outputs of said optical demultiplexer, each of said first plurality of optical switches also being coupled to said first input port of said first optical hub, said plurality of optical switches selectively coupling said first input port of said first optical hub and said first outputs of said optical demultiplexer to said first output port of said first optical hub.

8. An optical communication apparatus in accordance with claim 7, wherein said first optical hub further comprises an optical multiplexer coupled to said plurality of optical switches, said optical multiplexer receiving said plurality of second optical signals output from said plurality of optical switches and supplying said second optical signals to said looped optical communication path via said first output port of said first optical hub.

9. An optical communication apparatus in accordance with claim 1, further comprising a node configured to be coupled to said looped optical communication path, said node receiving one of said plurality of first optical signals and emitting one of said plurality of third optical signals.

10. An optical communication apparatus in accordance with claim 1, wherein said looped optical communication path is a first looped optical communication path, said optical communication apparatus further comprising:
a third optical hub having first and second input ports, and first and second output ports, said first input port configured to receive a fifth plurality of optical signals, said first output port being configured to output said fifth plurality of optical signals to a second looped optical communication path, said second input port being configured to receive a sixth plurality of optical signals and a seventh plurality of optical signals, and said second output port being configured to output said seventh plurality of optical signals; and
a fourth optical hub having first and second input ports and first and second output ports, said first input port being configured to receive said seventh plurality of optical signals from said looped optical communication path, said second input port being configured to receive said sixth plurality of optical signals, said first output port being configured to output an eighth plurality of optical signals, and said second output port being configured to output said sixth and seventh pluralities of optical signals to said second input port of said third optical hub.

11. An optical communication apparatus in accordance with claim 10, wherein each of said fifth plurality of optical signals is at a respective one of said first plurality of wavelengths, and each of said seventh plurality of optical signals is at a respective one of said second plurality of wavelengths.

12. An optical communication apparatus in accordance with claim 10, wherein each of said fifth plurality of optical signals is at a respective one of a third plurality of wavelengths different than said first plurality of wavelengths, and each of said seventh plurality of optical signals is at a respective one of a fourth plurality of wavelengths different than said second plurality of wavelengths.

13. An optical communication apparatus in accordance with claim 10, wherein said pluralities of first and third optical signals propagate in said first looped optical communication path in a first direction, and said pluralities of fifth and seventh optical signals propagate in said second looped optical communication path in a second direction different than said first direction.

14. An optical communication apparatus in accordance with claim 1, wherein said looped optical communication path carries groups of optical signals propagating in different directions along said looped optical communication path.

15. An optical communication apparatus, comprising:
an optical demultiplexer having an input receiving first and second pluralities of optical signals, each of said first plurality of optical signals being at a respective one of a first plurality of wavelengths, and each of said second plurality of optical signals being at a respective one of a second plurality of wavelengths, said optical demultiplexer having a plurality of outputs, each of a first subgroup of said plurality of outputs supplying a respective one of said first plurality of optical signals, and each of a second subgroup of said plurality of outputs supplying a respective one of said second plurality of optical signals;
a first plurality of photoelectric conversion elements, each of which being coupled to a respective one of said first subgroup of said plurality of outputs of said optical demultiplexer and receiving a respective one of said first plurality of optical signals, said first plurality of photoelectric conversion elements outputting a first plurality of electrical signals in response to said first plurality of optical signals;
a second plurality of photoelectric conversion elements, each of which being configured to receive a respective one of a third plurality of optical signals, each of which being at a respective one of said first plurality of wavelengths, said second plurality of photoelectric conversion elements outputting a second plurality of electrical signals in response to said second plurality of optical signals;
a plurality of comparison circuits, each of which being coupled to a respective pair of one of said first plurality of photoelectric conversion elements and one of said second plurality of photoelectric conversion elements, each of said photoelectric conversion elements receiving a respective one of said first plurality of electrical signals and one of said second plurality of electrical signals and outputting a respective one of a third plurality of electrical signals in response thereto;
a plurality of optical transmitters, each of which being coupled to a respective one of said plurality of comparison circuits and generating a respective one of a fourth plurality of optical signals in response to a respective one of said third plurality of electrical signals.

16. An optical communication apparatus in accordance with claim 15, further comprising an optical multiplexer having an output and a plurality of inputs, each of which being coupled to a respective one of said plurality of optical transmitters, said optical multiplexer being configured to combine said fourth plurality of optical signals onto an optical communication path.

17. An optical communication apparatus in accordance with claim, 15, wherein each of said third plurality of optical signals is at a respective one of said first plurality of wavelengths.

18. An optical communication apparatus in accordance with claim 15, further comprising:
an optical hub having first and second input ports and an output port, said first input port being configured to receive said first plurality of optical signals, said second input port being configured to receive said second plurality of optical signals, and said output port being configured to output said first and second pluralities of optical signals to said input of said optical demultiplexer.

19. An optical communication apparatus, comprising:
a looped optical communication path;
a first hub provided along said looped optical communication path, said first hub selectively supplying a first plurality of optical signals to said optical communication path and supplying a second plurality of optical signals to said optical communication path, said first plurality of optical signals propagating in a first direction along said optical communication path, and said second plurality of optical signals propagating in a second direction along said optical communication path different than said first direction, said first hub further extracting third and fourth pluralities of optical signals from said optical communication path, said third plurality of optical signals propagating in said first direction and said fourth plurality of optical signal propagating in said second direction; and second hub coupled to said optical communication path, said second hub supplying a fifth plurality of optical signals to said optical communication path and selectively supplying a sixth plurality of optical signals to said optical communication path, said fifth plurality of optical signals propagating in said first direction along said optical communication path, and said sixth plurality of optical signals propagating in said second direction along said optical communication path, said second hub further extracting seventh and eighth pluralities of optical signals from said optical communication path, said seventh plurality of optical signals propagating in said first direction and said eighth plurality of optical signal propagating in said second direction.

* * * * *